United States Patent [19]

Devarakonda et al.

[11] Patent Number: 5,490,270
[45] Date of Patent: Feb. 6, 1996

[54] SIMULTANEOUS UPDATES TO THE MODIFICATION TIME ATTRIBUTE OF A SHARED FILE IN A CLUSTER HAVING A SERVER AND CLIENT NODES

[75] Inventors: Murthy V. Devarakonda, Ossining; William A. Kish, Millerton; Ajay Mohindra, Tarrytown; Anthony J. Zlotek, Pleasant Valley, all of N.Y.

[73] Assignee: International Business Machines Corporation, Armonk, N.Y.

[21] Appl. No.: 260,867

[22] Filed: Jun. 16, 1994

[51] Int. Cl.$^6$ .................................................. G06F 17/30
[52] U.S. Cl. ................. 395/600; 395/200.18; 395/477; 395/800; 364/242.94; 364/282.4; 364/284.4; 364/DIG. 1; 364/974.7; 364/DIG. 2
[58] Field of Search ................................. 395/600, 425, 395/200, 700, 200.18, 800, 477

[56] References Cited

U.S. PATENT DOCUMENTS

| | | | |
|---|---|---|---|
| 4,234,918 | 11/1980 | Chu et al. | 395/575 |
| 5,136,691 | 4/1992 | Baror | 395/200 |
| 5,185,878 | 2/1993 | Baror et al. | 395/425 |
| 5,263,155 | 11/1993 | Wang | 395/600 |
| 5,297,269 | 3/1994 | Donaldson et al. | 395/425 |

Primary Examiner—Thomas G. Black
Assistant Examiner—Paul R. Lintz
Attorney, Agent, or Firm—Richard M. Ludwin

[57] ABSTRACT

A system and method for avoiding serialization on updating the modification time of files in a cluster system. In accordance with the method, the modification time field of a file can be accessed by multiple readers or multiple writers and each client in the cluster system can update their own copy of the modification time. Whenever a client requests to read the modification time, the copies of the modification time are reconciled. The copies of the modification times are also reconciled when a cache flush or synchronization operation forces such reconciliation. The present system and method supports the requirement (of certain operating systems such as UNIX) that an explicit user-issued command to set the modification time is accomplished by granting an exclusive-write mode for the modification field.

20 Claims, 7 Drawing Sheets

SIMULTANEOUS UPDATES TO THE MODIFICATION TIME ATTRIBUTE OF A SHARED FILE IN A CLUSTER HAVING A SERVER AND CLIENT NODES

I. BACKGROUND OF THE INVENTION a. Field of the Invention

This invention relates to updating the modification time of a file in a cluster system.

b. Related Art

In a Unix filesystem, a record is kept of the time at which the last modification of a file took place. In a cluster system, it is possible that a given file may be modified simultaneously from multiple nodes. In this scenario, the system must guarantee that the modification time for the file is accurately maintained.

One approach to modification time maintenance is to require a node to obtain exclusive access to the modification time whenever it modifies a file. This approach however, leads to contention among the nodes in the system.

II. SUMMARY OF THE INVENTION

The present invention avoids contention among the nodes in the system, and allows multiple nodes within the cluster to update the modification time of a single file simultaneously, while guaranteeing that the modification time of that file will be accurately reflected for any reader of the modification time.

In the preferred embodiment, a distributed lock manager provides locks of three different types, namely, READ, WRITE-SHARED, and WRITE-EXCLUSIVE. A READ lock prevents any task from writing to the locked file or segment but allows multiple readers to read the file or segment. A WRITE-SHARED allows any task to write to the locked file or segment, but prevents any task from reading the locked file or segment. A WRITE-EXCLUSIVE lock allows only the locking task to write to a locked file or segment but prevents all tasks from reading the file or segment and prevents all tasks, other than the task who has the lock token, from writing to the locked file or segment. After acquiring a lock on the modification time, a node is allowed to cache the modification time, so long as the lock has not been revoked.

III. BRIEF DESCRIPTION OF THE DRAWING

IV. DETAILED DESCRIPTION OF THE PREFERRED EMBODIMENT

The method described is used for the maintenance of the modification time for files in a cluster filesystem. The distributed lock manager of the cluster system provides locking services which are used to serialize access to the modification time in such a way that multiple concurrent updates of the modification time are allowed. The internal protocols of the distributed lock manager can be of any suitable conventional type which provides read (READ), exclusive write (WRITE-EXCLUSIVE), and shared write (WRITE-SHARED) locks. For example, the protocol described in U.S. patent application Ser. No. 08/187,432, filed on Jan. 26, 1994 (which is incorporated by reference in its entirety) is of a suitable type which can be readily modified to include a WRITE-SHARED lock. For purposes of this document, WRITE-SHARED and WRITE-EXCLUSIVE locks will often be generically referred to as WRITE locks.

Figure 1:
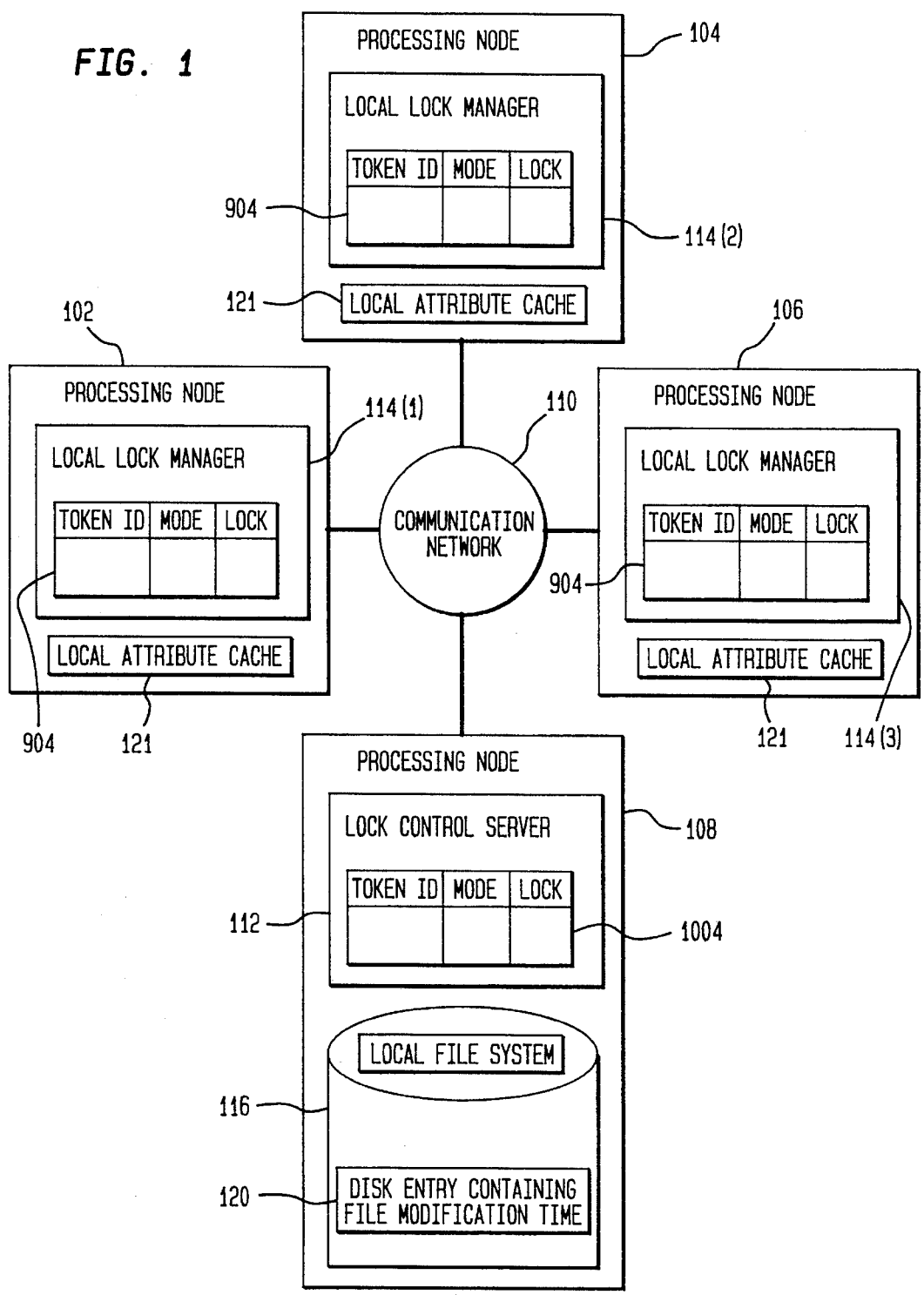
FIG. 1 depicts a loosely coupled system suitable for use with the present invention.

A loosely coupled system suitable for use with the present invention is illustrated in FIG. 1. The system includes a number of processing nodes (sometimes referred to as nodes) 102–108 interconnected by way of a communication network 110. Each of the nodes can be running one or more processes which can request locks on shared files. The nodes 102–108 can be embodied, for example, on IBM RISC System/6000 machines using AIX 3.2. The communications protocol can be, for example, SUN Microsystems RPC (remote procedure call), which can run either on UDP/IP or TCP/IP. The network 110 can be of any conventional type, for example a token ring.

Each of the nodes 102–108 includes a lock control server (LCS) 112 and a local lock manager (LLM) 114. Within each system, the LCS controls access to the shared files 116 that the system owns. The local lock managers 114(1)–114(3) grant locks on a file only after they have acquired appropriate lock granting authority from the lock control manager which is the owner of the file. In the system of FIG. 1, the LCS and shared file is shown only in one of the nodes while LLMs are shown in each of the other nodes. It should be understood, however, that one or more sets of shared files, an LLM, and an LCS can be present in each of the nodes.

The lock control server 112 maintains all of the control information for the resources it owns in a state table 1004. In the embodiment of FIG. 1, the lock control server is a passive and state-full lock manager. By passive, it is meant that the lock control server does not send any messages to other nodes on its own. By "state-full" it is meant that the lock control server maintains the exact state information about the location of the tokens, along with their modes, at all times.

The LCS forms messages to generate appropriate lock requests on the network 110. Lock request messages which can be generated by an LLM include ACQUIRE, UPGRADE, GIVEUP and CHANGE-TOKEN. The particular type of message used is selected by the node based on information in the lock state table 904.

A node uses an ACQUIRE control message when it does not have a token for the file in question. A node uses an UPGRADE control message when it has a READ token, but needs a WRITE token or when it has a WRITE-SHARED token and it needs a WRITE-EXCLUSIVE token. The GIVEUP control message is a mechanism for a node to relinquish a token voluntarily. A node may want to do so when, for example, it is short of memory for its local state. In particular, if a node needs to acquire a token on a new file and its local state table is full, then the node gives up the token on one of the other files, thus making room for the new one. Finally, a node uses a CHANGE-TOKEN control message when it wants to change the state of a token at the LCS.

Each of the local lock managers 114(1)–114(3) include software tasks which are executed under control of the system's main control program (operating system) and one or more data structures (lock tables) which store the control information for the shared files owned by the system. Specifically, each lock control manager includes two tasks: a granularity task which determines the proper granularity of a token and a lock management task which makes token requests and manages the lock control protocol for the system.

The lock management task of a local lock manager works as follows: Assume that a requesting process executing on a given node (the requesting node) wants to acquire a lock on a given file A in mode X, where X is READ or WRITE-EXCLUSIVE. First, the LLM examines its state table 904 to determine if there is an entry for file A. If there is not such an entry, the LLM determines the proper granularity for the token request. Then, the LLM sends an ACQUIRE request to the LCS that owns file A and waits for a reply.

Upon receipt of the reply, the LLM examines the reply and determines whether the token has been granted (reply is OK). If the token has been granted, the LLM adds an entry to its state table 904 (indicating the token mode) and sets the lock bit. This completes the token acquisition and granting of the lock request. If the token has not been granted (reply is NOT OK), the reply from the LCS contains a copyset (a list) of the current token holders. In this case, the LLM sends a DOWNGRADE or REVOKE message to the copyset nodes. The LLM sends the DOWNGRADE message if it needs to acquire a READ token. The LLM sends a REVOKE message if it needs to acquire a WRITE-EXCLUSIVE token.

After receiving acknowledgement (OK message) from all of the copyset nodes, the LLM informs the LCS that the token has been downgraded or revoked. In response, the LCS changes the state table 1004 entry for the token to reflect that the requesting LLM is a holder of the token and it is in the requested mode. The LCS then sends an acknowledgement to the requesting LLM.

After receiving the acknowledgement from the LCS, the LLM adds an entry to its state table 904 and then sets the lock bit for that entry. This completes token acquisition and granting of the lock request.

If, when the LLM initially examines its state table 904, it finds an entry for file A, the LLM checks the token state (in the mode field) to determine if it is in transition. A token state is in transition if another process is waiting for a response from another LLM as a prerequisite to change the token state. The state table mode field indicates the specific type of transition that the entry is in (e.g. READ changing to WRITE-SHARED, acquiring, etc.). If the token state is in transition, the requesting process awaits for the transition state to end.

If the token state is not in transition, the LLM determines if the file is locked by another process executing on the same node. This is indicated by the lock bit in the state table entry for the token being set (logical 1). If the token is locked, the requesting process waits for the other process to release the lock.

If the lock bit is not set, the LLM determines if the token state is compatible with the requested state. For example, if the node has a READ token, this is compatible with a request for a READ lock by a process executing on the node. On the other hand, a READ token is not compatible with a request for a WRITE lock. If the token state is compatible with the requested state, the LLM sets the lock bit in the LLM state table entry for the file and returns an indication to the requesting process that the resource has been locked. This completes lock granting. If the requested state is incompatible with the token state, the LLM performs steps 306 and 308 as previously described.

When an LLM wants to upgrade a token (e.g. it has a READ token and it wants a WRITE token or it has a WRITE-SHARED token and it wants a WRITE-EXCLUSIVE token) it sends an UPGRADE request to the LCS and awaits a reply. Upon receipt of the reply, the LLM checks to see if the token has been upgraded. If the token has been upgraded, the LLM updates the state of the token in its table and thus complete the token upgrade. If the token has not been upgraded, the reply from the LCS contains the copyset of current token holders and in response, the LLM sends a revoke messages to the copyset nodes.

After receiving acknowledgement from the copyset nodes, the LLM informs the LCS that the token has been revoked. In response, the LCS changes the LCS state table entry for the token to reflect that the requesting LLM is the only holder of the token and the token is in the requested mode. The LCS then sends an acknowledgement to the requesting LLM. After receiving an acknowledgement, the LLM updates the state of the token in its own state table 904 and thus completes the token upgrade.

Whenever a token is to be given up by an LLM, the LLM sends a GIVEUP request to the LCS and awaits a reply. In response, the LCS changes its state table to reflect that the requesting LLM does not have the token anymore and sends an acknowledgement. Upon receipt of the acknowledgement, the LLM removes the token entry from its table and thus completes the token give-up.

When the LCS receives an ACQUIRE or UPGRADE request from an LLM, the LCS task looks up the token in the LCS state table 1004. If an entry is found for the token, the LCS task checks if the token state has been put in a transition state by another node. If the token state is in transition, this thread of the LCS task sleeps until the transition is cleared. If the token state is not in transition, the LCS task compares the token state with the requested state to determine if the states are compatible.

If the states are compatible, the LCS task adds the requesting node to the copyset for the token's LCS state table entry and sends an acknowledgement to the requesting LLM. If the states are not compatible the LCS task marks the entry as being in-transition and returns the present copyset to the requesting LLM.

If, an entry is not found for the token when the LCS initially checks the LCS table, the LCS task adds an entry (for this token) to its state table, adds the requesting node to the copyset for this entry and returns an acknowledgment (OK) message to the requesting LLM to indicate that the token has been granted.

When a CHANGE-TOKEN request is received from an LLM, the LCS task locates the token entry in its LCS table. Then, the LCS task clears the transition flag from the mode field and updates the copyset. Next, the LCS task adds the requesting node to the copyset and returns an acknowledgement (OK) message to the requesting LLM.

A file's modification time is stored at the file server node on the same storage device 116 as the file data 120 itself.

After acquiring appropriate locks, described by the following semantics, other nodes retrieve the file modification time information from the file server node 108, and cache that information in their local attribute cache 121. This information remains cached until another node requests a conflicting lock.

Figure 2:
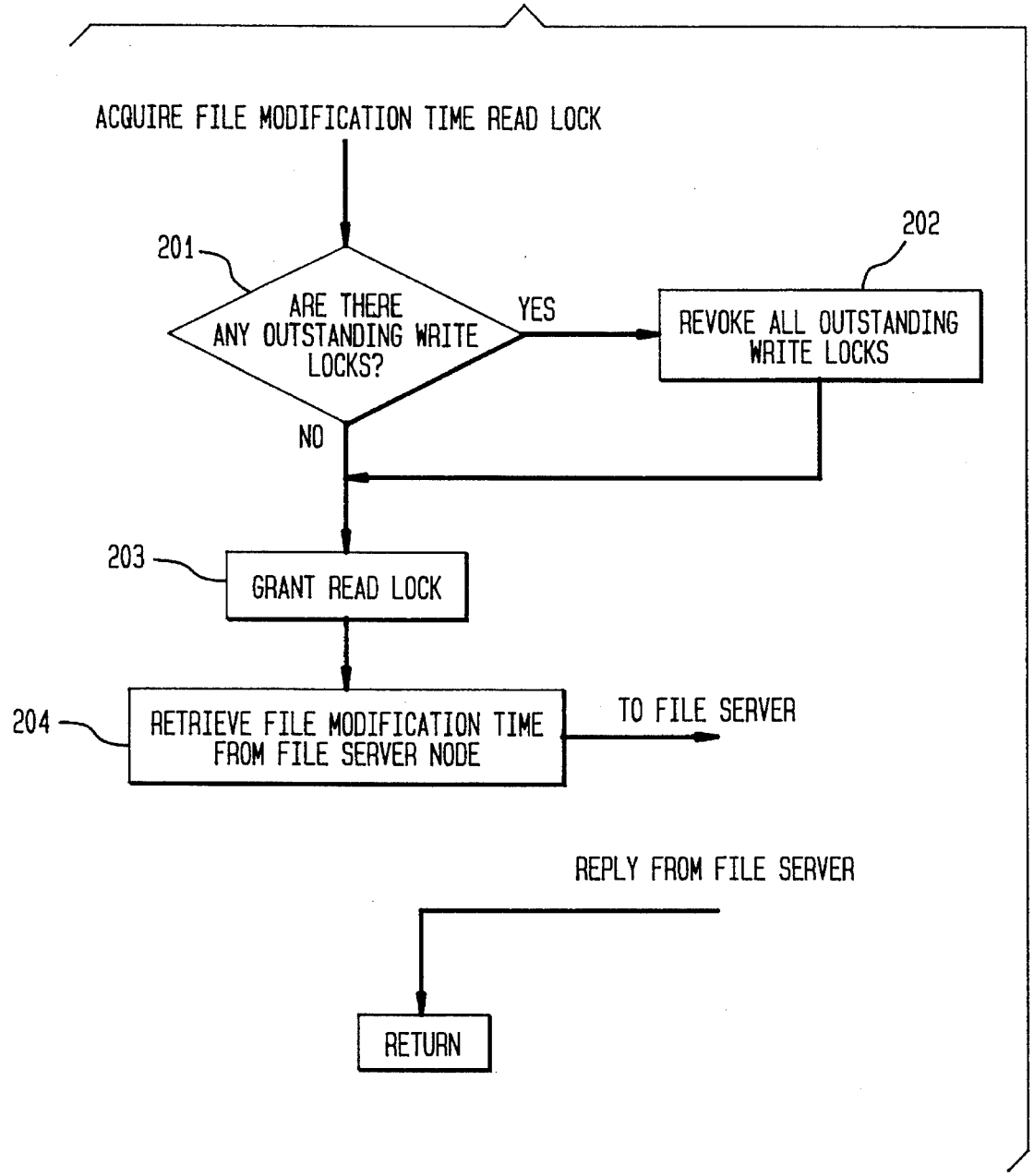
FIG. 2 is a flow chart of the handling of a READ lock request.

A process requests a lock in READ mode when it wishes to examine the modification time. The LLM will block the requesting process until all outstanding WRITE locks have been revoked. The semantics for acquiring a READ lock on the modification time are shown in the flow chart of FIG. 2.

A process executing on a particular node requests a READ lock by making a call to the node's LLM. In step 201, the LLM determines if there are any outstanding WRITE locks (either SHARED or EXCLUSIVE) on the file. If there are any outstanding WRITE locks at other nodes, in step 202, the LLM revokes all these outstanding WRITE locks. In response to this revocation, each node holding a WRITE lock sends it's local version of the file modification time (stored in the node's local attribute cache 121) by way of a message to the file server node, as described in FIG. 5a. The actions performed at the file server node are described in FIG. 6b.

If there exist multiple WRITE-SHARED locks, then as the nodes send their version of the modification time to the file server node 108, the file server node reconciles the modification time versions by choosing the latest time to be the "official" file modification time.

Figure 6A:
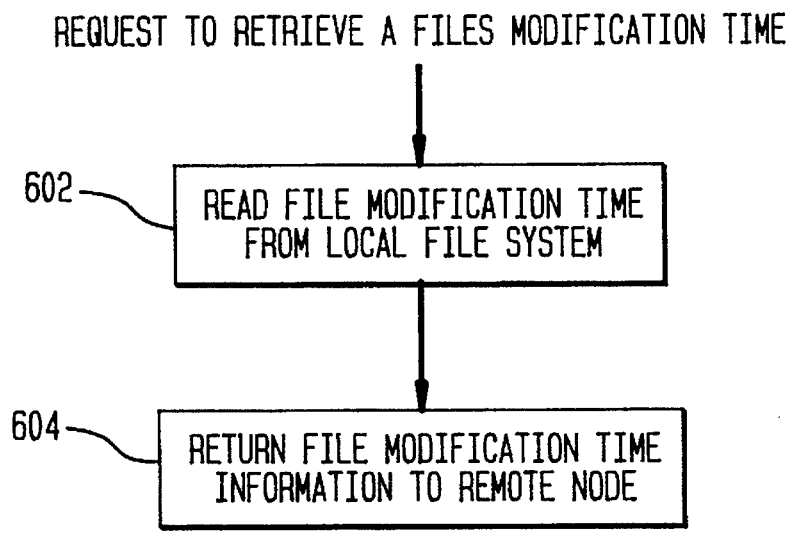
FIGS. 6a and 6b are flow charts of the file server processing of file modification time read/write requests; and, FIG. 7 is a flow chart of a method for determining the type of lock a task desiring to modify the modification time will request.

In step 203, all outstanding WRITE locks have been released, and the file modification time is now accurate at the file server node. At this point, a READ lock is granted by the LLM. The requesting process then retrieves the file modification time from the file server node. FIG. 6a describes the actions performed at the server to retrieve the file modification time information.

Figure 3:
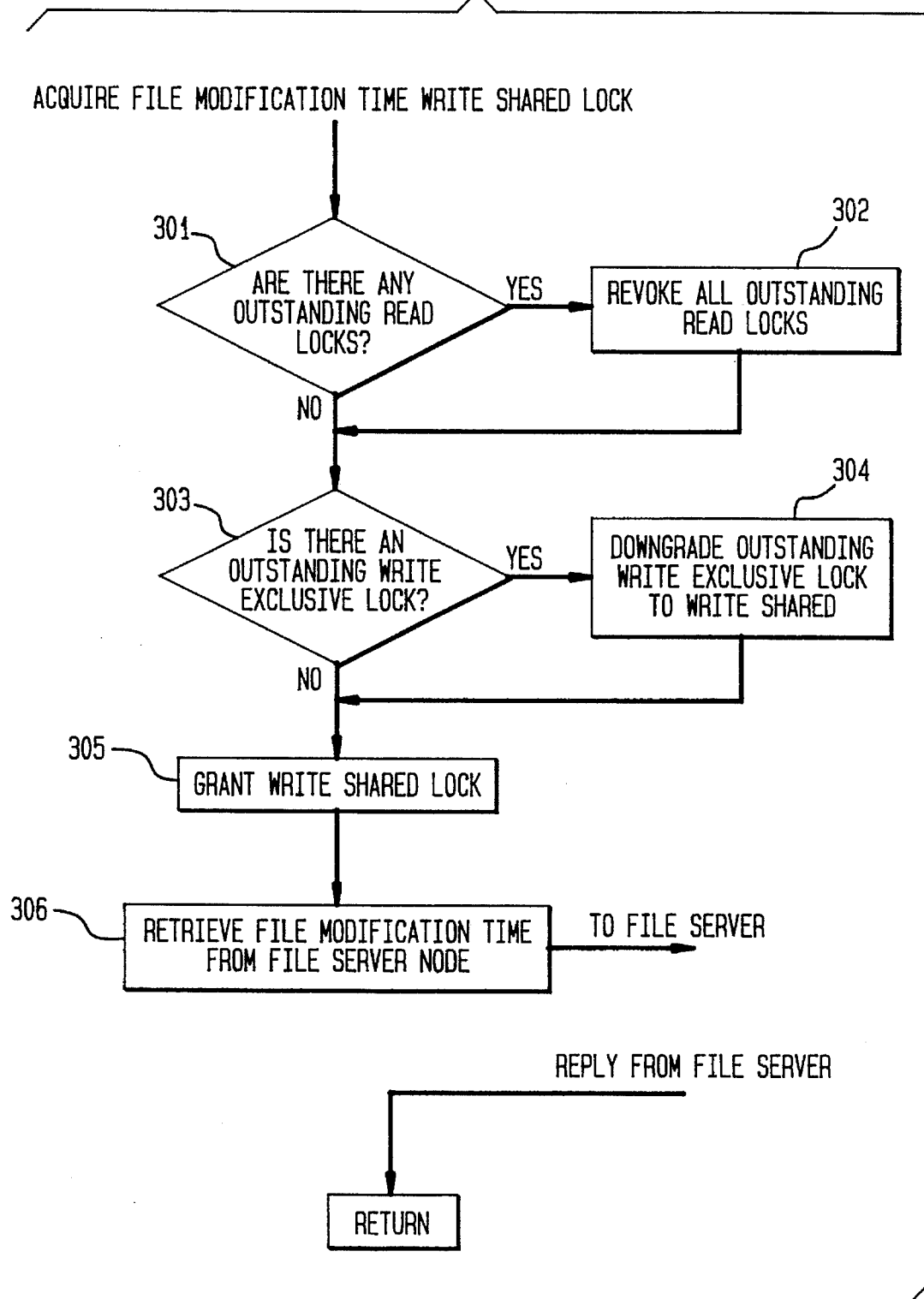
FIG. 3 is a flow chart of the handling of a WRITE (shared) lock request.

A process requests a lock in WRITE-SHARED mode when it wishes to make modifications to the file. In this case, the modification time of the file must reflect the time when the last modification was made at any node. The LLM blocks the requesting process until all outstanding READ and WRITE-EXCLUSIVE locks have been revoked. The semantics for acquiring a WRITE-SHARED lock on the modification time are described by the flow chart in FIG. 3.

A process requests a WRITE-SHARED lock by making a call to the LLM. At 301, the LLM determines if there are any outstanding READ locks on the file. If there are any outstanding READ locks, at 302, the LLM will revoke all outstanding READ locks. As a result of this revocation, each node holding a READ lock will invalidate it's local copy of the modification time, as described in FIG. 5b. At 303, the LLM determines if there is an outstanding WRITE-EXCLUSIVE lock on the file. If there is an outstanding WRITE-EXCLUSIVE lock, at 304 the LLM will downgrade the outstanding WRITE EXCLUSIVE lock. As a result of this downgrade, the node holding the WRITE-EXCLUSIVE lock will send it's local version of the file modification time to the file server node, as described in FIG. 5a.

Figure 6B:
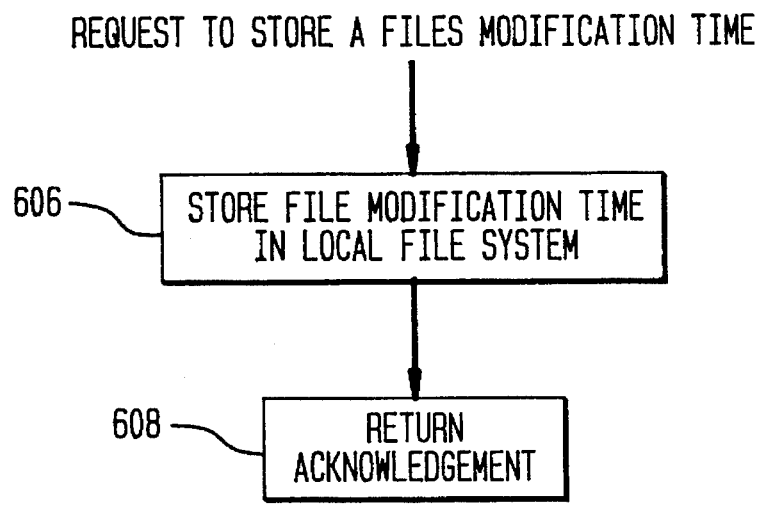

At 305, all outstanding READ and WRITE-EXCLUSIVE locks have been revoked, and the file modification time is now accurate at the file server node. At this point, the process is granted a WRITE-SHARED lock by the LLM, and it then retrieves the modification time from the file server node. FIGS. 6a and 6b describe the actions performed at the server to retrieve the file modification time information.

Figure 4:
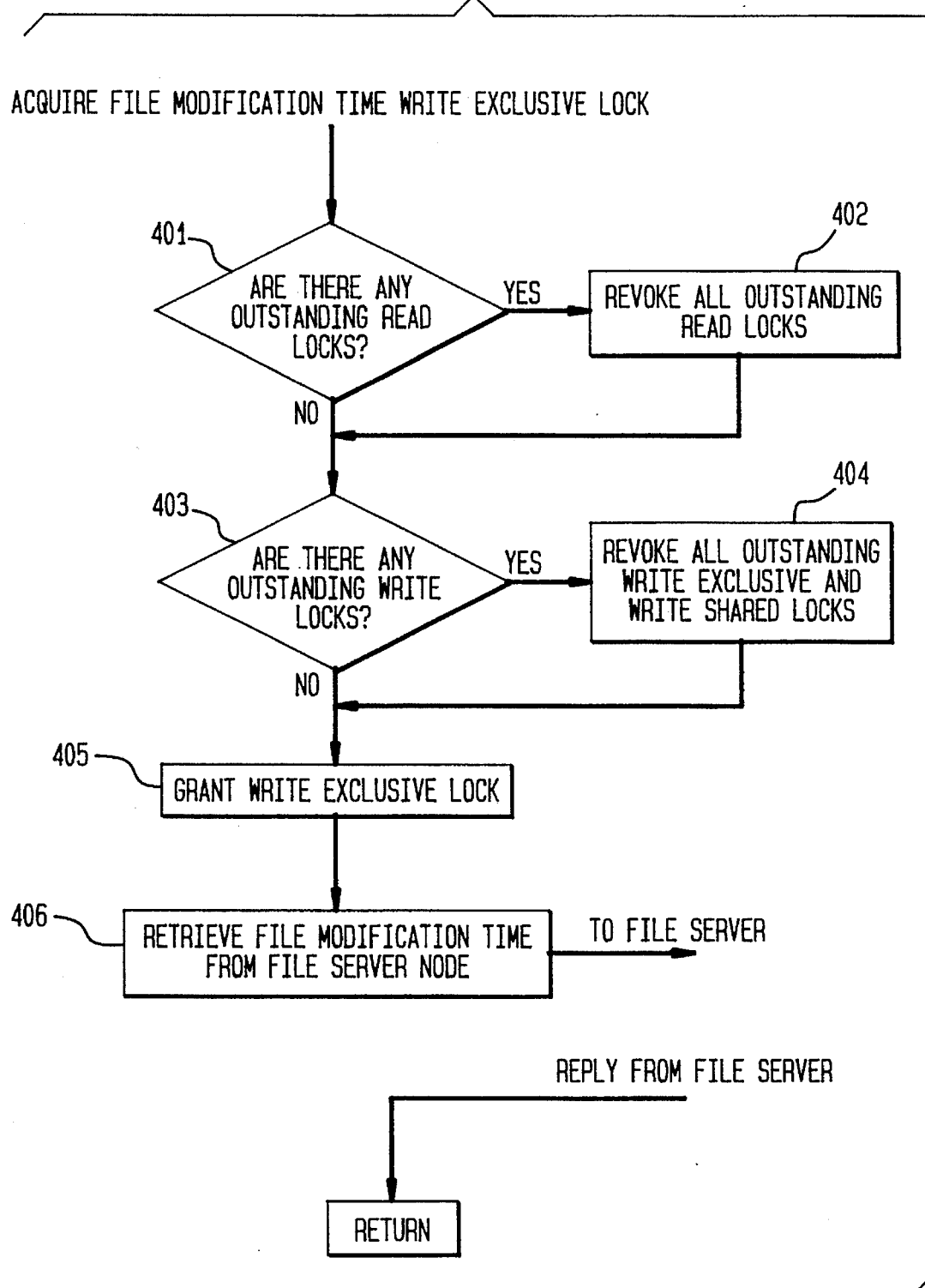
FIG. 4 is a flow chart of the handling of a WRITE (exclusive) lock request.

A process requests a WRITE-EXCLUSIVE lock when it wishes to explicitly change the file modification time. The LLM will block the requesting process until all outstanding READ, WRITE-SHARED, and WRITE-EXCLUSIVE locks have been revoked. The semantics for acquiring a WRITE-EXCLUSIVE lock on the modification time are described by the flow chart in FIG. 4.

A process requests a WRITE-EXCLUSIVE lock by making a call to the LLM. In step 401, the LLM determines if there are any outstanding READ locks on the file. If there are any outstanding READ locks, in step 402, the LLM revokes all outstanding READ locks. As a result of this revocation, each node holding a READ lock invalidates it's local copy of the modification time, as described in FIG. 5b. In step 403, the LLM determines if there are any outstanding WRITE locks on the file. If there are outstanding WRITE locks, at 404, the LLM revokes the outstanding WRITE locks. As a result of this revocation, the nodes holding the WRITE locks will send their local version of the file modification time to the file server node, as described in FIG. 5a.

At 405, all outstanding READ and WRITE locks have been revoked, and the file modification time is now accurate at the file server node. At this point, the process is granted a WRITE-EXCLUSIVE lock by the LLM.

At 406, a message is sent to the file server node, and the actions described in FIG. 6a are performed at the file server node.

Figure 5A:
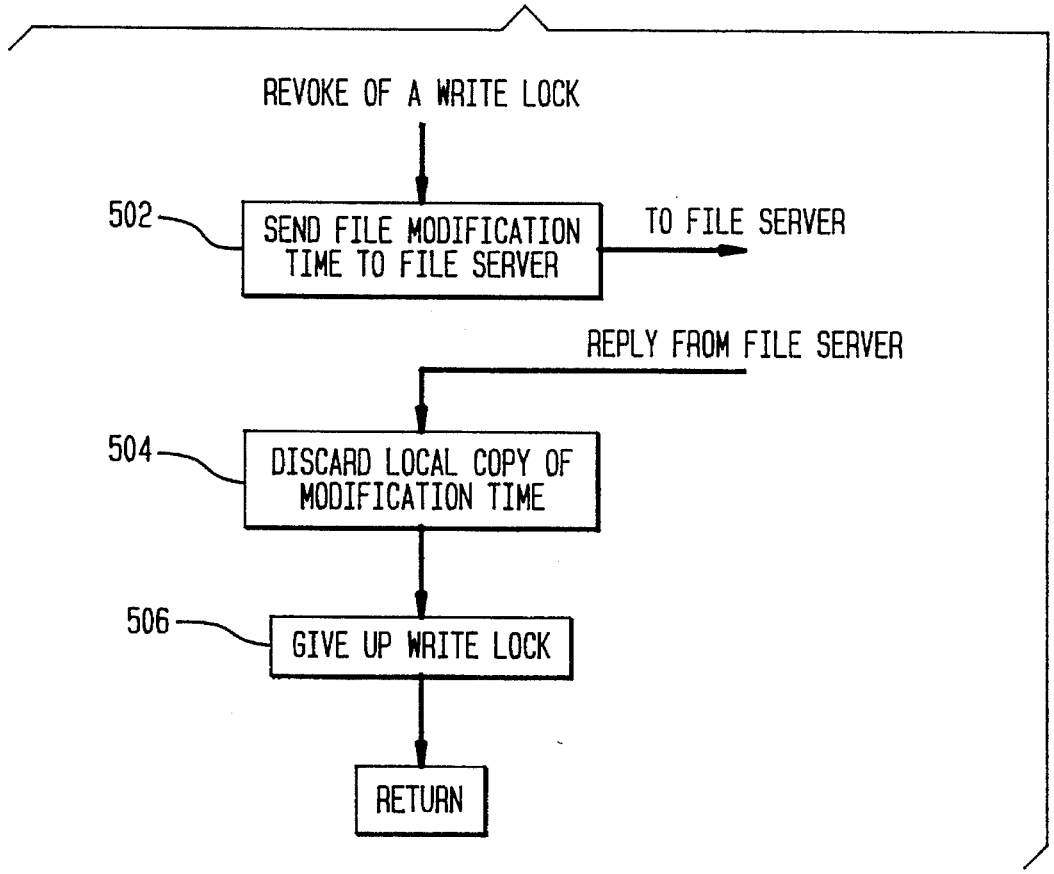
FIG. 5a is flow chart of the handling of a revocation of a WRITE (exclusive) lock on the file modification time.

The handling, by a node, of a revocation of its WRITE-EXCLUSIVE lock on the file modification time is shown in FIG. 5a. When an node receives a REVOKE message for its WRITE-EXCLUSIVE LOCK, in step 502 it sends its copy of the file modification time to the file server 108 and waits for a reply in the form of an acknowledgement. When the node receives the reply, in step 504 it discards its locally cached copy of the file modification time and in step 506 broadcasts a GIVEUP message for lock to the other nodes on the network.

Figure 5B:
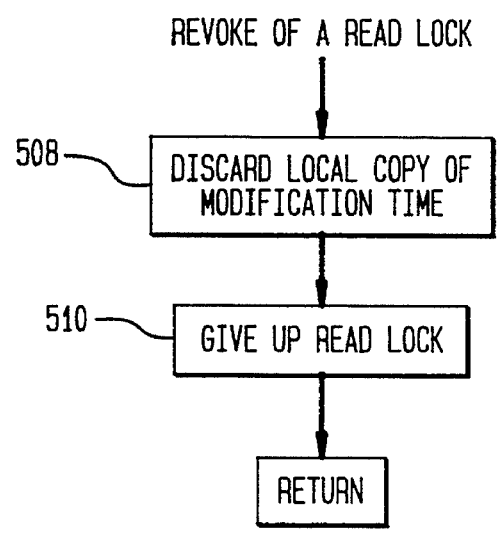
FIG. 5b is flow chart of the handling of the revocation of a READ lock on the file modification time.

FIG. 5b shows how a node handles the revocation of a READ lock on the file modification time. When a node receives a revocation message for its READ lock, in step 508 it discards its locally cached copy of the file modification time. Then, in step 510 the node gives up is READ lock by broadcasting a GIVEUP message to the other nodes on the network.

FIGS. 6a and 6b are flow charts of the file server processing of file modification time read/write requests. As shown in FIG. 6a, when the server 108 receives a request (from a client node) to retrieve a file's modification time, in step 602 it reads the file modification time from appropriate entry 120 the local filesystem 116. Then, in step 604 the server sends the file modification time information to the requesting client node.

As shown in FIG. 6b, when the server 108 receives a request to store a new modification time for a file, in step 606 it stores the new modification time in the appropriate disk entry 120 in the local filesystem 116. Then, in step 608 the server returns an acknowledgement to the requesting node.

Figure 7:
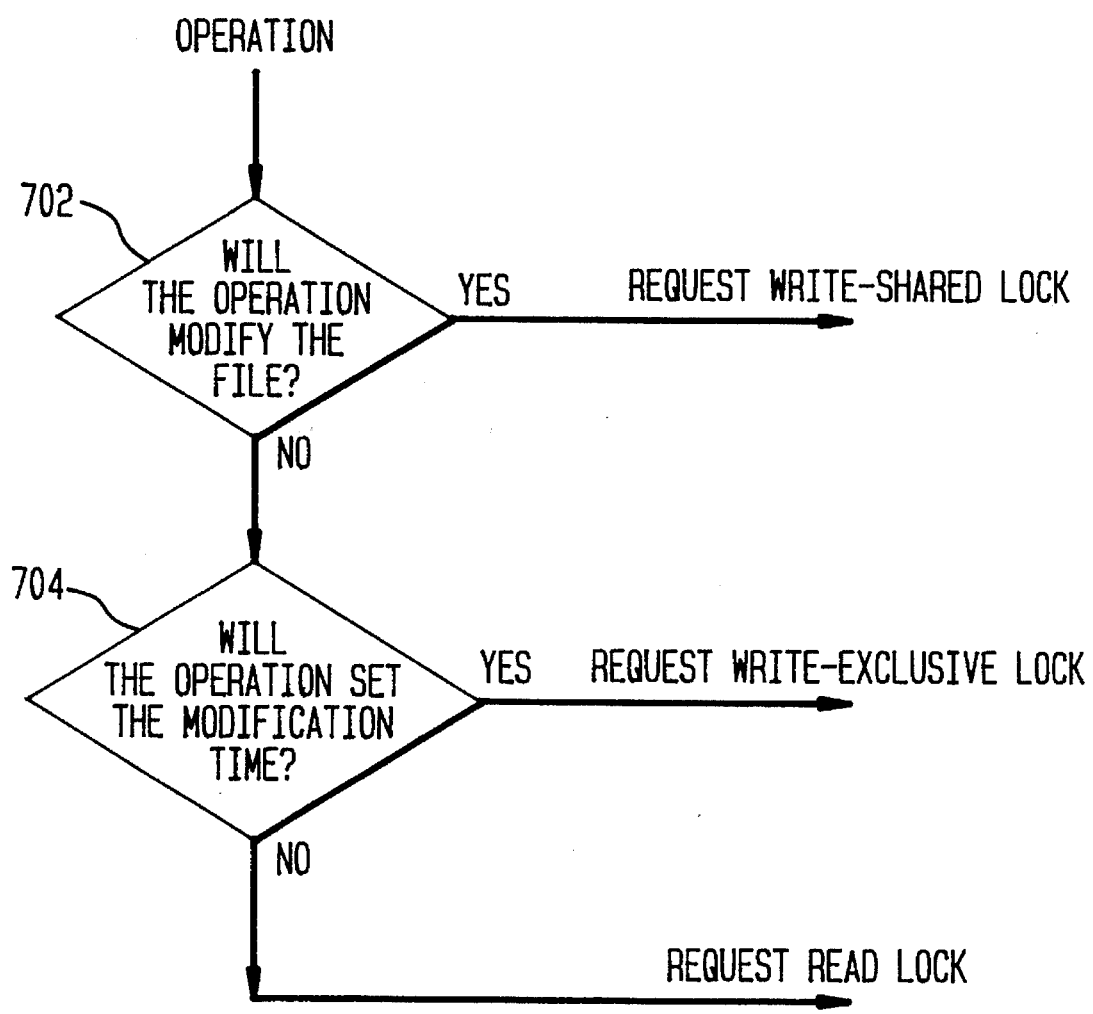

FIG. 7 is a flow chart of how an task determines which type of token to request when one of its operations needs to modify the modification time. In step 702, the task determines if an operation will modify the contents of the file. If yes, the task requests a WRITE-SHARED lock on the modification time. If no, in step 704 the task determines if the operation will not modify the contents of the file but just set the modification time. If yes, the task requests a WRITE-EXCLUSIVE lock on the modification time. In no (neither of the above two cases apply) the task requests a READ lock on the modification time.

Now that the invention has been described by way of the preferred embodiment, various modifications and improvements will occur to those of skill in the art. Thus, it should be understood that the preferred embodiment has been provided as an example and not as a limitation. The scope of the invention is defined by the appended claims.

We claim:

1. A method for updating the modification time of files in a cluster system having a plurality of clients which can access a modification time field of a shared file stored on a commonly accessible storage device, comprising the steps of:

maintaining at each of the clients, a locally cached copy of the modification time field of the shared file, allowing each of the clients to simultaneously update their local copy of the modification time, reconciling the local copies whenever one of the clients requests to read the modification time.

2. The method of claim 1 comprising the further step of: when one of the clients requests to explicitly set the modification time, granting, by a server, an exclusive-write lock to the one of the clients on the modification time field of the shared file.

3. The method of claim 1 wherein the reconciling includes the further step of reconciling the separate copies when a cache flush of a memory storing the modification time occurs.

4. The method of claim 1 wherein the reconciling comprises the further steps of: sending the locally cached copy of the modification time stored at each client to a server; selecting the most recent modification time from the copies, by the server; and, writing the most recent modification time in the modification time field of the shared file.

5. The method of claim 1 comprising the further step of, prior to allowing the simultaneous updates on the copies of the modification time, obtaining, by each of the clients, a shared write lock on the modification time field; wherein none of the clients can read the modification time and subsequent to the updating, giving up the shared write locks by the clients.

6. The method of claim 1 comprising the further steps of, prior to allowing any of the clients to reference the modification time, determining a type of lock a client should obtain, the type of lock being selected from the group of a shared read lock wherein any client can read its cached copy of the modification time but no client may write to the cached copy, a shared write lock wherein any client may write to its cached copy but no client can read the modification time and an exclusive write lock wherein only a locking client can read and write the modification time.

7. A method for updating a modification time field of a file in a cluster system having a plurality of client nodes, comprising the steps of:

maintaining, at each of the client nodes, a copy of the modification time specified in the modification time field;

concurrently updating, by at least some of the clients nodes, their respective modification time copy, when a client requests to read the modification time field of the file, reconciling each copy with one another, and when an explicit user-issued command to set the modification time superseding all others is issued by a client node, granting an exclusive-write lock on the modification time field.

8. The method of claim 7 wherein the reconciling comprises the further steps of: sending the locally cached copy of the modification time stored at each client to a server; selecting the most recent modification time from the copies, by the server; and, writing the most recent modification time in the modification time field of the shared file.

9. A method for updating the modification time of files in a cluster system having a plurality of clients which can access and simultaneously update a modification time field of a shared file stored on a commonly accessible storage device accessed under control of a server, comprising the steps of:

maintaining at a local cache in each of the clients, a copy of the modification time, when one of the clients requests to explicitly set the modification time, granting, by the server, a write lock to the one of the clients on the modification time field of the shared file, whenever one of the clients requests to read the modification time reconciling the locally cached copies of the modification time by sending the copy of the modification-time maintained at each client to the server; causing the server to select the most recent modification time from the modification time copies; and, writing the most recent modification time in the modification time field of the shared file.

10. The method of claim 9 wherein the reconciling comprises the further steps of sending the most recent modification time to a plurality of the clients and storing the most recent copy of the modification time in the local cache of each of the plurality of clients.

11. The method of claim 10 wherein the reconciling includes the further step of reconciling the separate copies when a cache flush of a memory storing the modification time occurs.

12. The method of claim 10 comprising the further step of, prior to allowing the simultaneous updates on the copies of the modification time, obtaining, by each of the clients, a shared write lock on the modification time field; wherein none of the clients can read the modification time and subsequent to the updating, giving up the shared write locks by the clients.

13. The method of claim 10 comprising the further steps of, prior to allowing any of the clients to reference the modification time, determining a type of lock a client should obtain, the type of lock being selected from the group of a shared read lock wherein any node can read its cached copy of the modification time but no node may write to the cached copy, a shared write lock wherein any node may write to its cached copy but no node can read the modification time and an exclusive write lock wherein only the locking node can read and write the modification time.

14. The method of claim 10 wherein the write lock is an exclusive write lock wherein only one of the clients can update its copy of the modification time.

15. A system for maintaining the modification time of files in a cluster system, said cluster system comprising client and at least one server node, and having a plurality of clients which can access a modification time field of a shared file, comprising:

a communication network;

a plurality of nodes coupled to the communication network, each of the nodes including a attribute cache for storing a copy of a modification time of the shared file and means for accessing the local copy of the modification time, wherein, each of the nodes can simultaneously update their local copy of the modification time.

at least one of the nodes being configured as a server and being connected to a disk instantiating a filesystem including the shared file and comprising means for reconciling the local copies whenever one of the clients requests to read the modification time; and, a lock manager coupled to each of the nodes the lock manager including means for granting an exclusive write lock to one of the nodes on the modification time field of the shared file, when the one of the nodes requests to explicitly set the modification time.

16. The system of claim 15 wherein the means for reconciling comprises means for receiving the locally cached copies of the modification time and selecting the most recent modification time from the copies, by the server; and, means for writing the most recent modification time in the modification time field of the shared file.

17. The system of claim 15 wherein the means for reconciling includes means for detecting when a flush of an at least one attribute cache occurs and for reconciling the separate copies when a flush is detected.

18. The system claim 15 wherein, prior to allowing the simultaneous updates on the copies of the modification time, each of the clients obtains a shared write lock on the modification time field; wherein none of the clients can read the modification time and subsequent to the updating, giving up the shared write locks by the clients.

19. The system of claim 15 wherein prior to allowing any of the clients to reference its local copy of the modification time, the lock manager determines a type of lock a client should obtain, the type of lock being selected from the group of a shared read lock wherein any node can read its cached copy of the modification time but no node may write to the cached copy, a shared write lock wherein any node may write to its cached copy but no node can read the modification time and an exclusive write lock wherein only the locking node can read and write the modification time.

20. The system of claim 15 wherein the lock manager is a distributed lock manager.

* * * * *